(12) United States Patent
Castillo et al.

(10) Patent No.: US 10,286,625 B2
(45) Date of Patent: May 14, 2019

(54) WRAPPING MATERIAL AND METHOD OF MANUFACTURE FOR BALING MATERIALS

(71) Applicant: Tama Plastic Industry, Ha'Emek (IL)

(72) Inventors: Juan Carlos Castillo, Reservoir (AU); Jason Boyd, Acacia Ridge (AU)

(73) Assignee: Tama Plastic Industry (IL)

( * ) Notice: Subject to any disclaimer, the term of this patent is extended or adjusted under 35 U.S.C. 154(b) by 0 days.

(21) Appl. No.: 14/904,605

(22) PCT Filed: Aug. 20, 2014

(86) PCT No.: PCT/AU2014/000821
§ 371 (c)(1),
(2) Date: Jan. 12, 2016

(87) PCT Pub. No.: WO2015/024052
PCT Pub. Date: Feb. 26, 2015

(65) Prior Publication Data
US 2016/0151994 A1    Jun. 2, 2016

(30) Foreign Application Priority Data

Aug. 20, 2013  (AU) ............................... 2013903145
Aug. 30, 2013  (AU) ............................... 2013903304

(51) Int. Cl.
*B32B 3/26*         (2006.01)
*A01F 15/07*       (2006.01)
(Continued)

(52) U.S. Cl.
CPC ............ *B32B 3/266* (2013.01); *A01F 15/071* (2013.01); *B32B 7/06* (2013.01); *B32B 7/14* (2013.01);
(Continued)

(58) Field of Classification Search
CPC .. B65D 65/14; B32B 7/14; B32B 7/06; B32B 25/08; B32B 27/08; B32B 3/266;
(Continued)

(56) References Cited

U.S. PATENT DOCUMENTS 5,623,812 A    4/1997  Todt
5,979,450 A *  11/1999 Baker .................... A61B 46/10
                                                                128/849

(Continued)

FOREIGN PATENT DOCUMENTS

AU      2003292463 A1    7/2004
AU      2005300259 A1    5/2006
(Continued)

OTHER PUBLICATIONS

International Search Report and Written Opinion for Application No. PCT/AU2014/000821 dated Sep. 26, 2014.
(Continued)

*Primary Examiner* — Patricia L. Nordmeyer
(74) *Attorney, Agent, or Firm* — Lerner, David, Littenberg, Krumholz & Mentlik, LLP (57) ABSTRACT

A wrapping material for formed bales of material. The wrapping material including at least one layer of a flexible plastic material film web having a substantially uniform width and divided lengthwise into portions of substantially equal length by a plurality of spaced lines of perforations extending fully transversely across the width of the wrapping material and fully through the layer or layers forming the wrapping material. Each said line of perforations having a first adhesive substrate adhered to a first surface of said wrapping material adjacent to but spaced from the line of perforations. The first adhesive substrate extending substantially across the width of said wrapping material and having, in use, an outwardly facing adhesive surface, and a second
(Continued)

adhesive substrate extending substantially across the width of said wrapping material and being adhesively secured to said first surface of the wrapping material whereby the second adhesive substrate overlies said line of perforations.

21 Claims, 7 Drawing Sheets (51) Int. Cl.
| | |
|---|---|
| B32B 27/08 | (2006.01) |
| B32B 37/12 | (2006.01) |
| B32B 37/14 | (2006.01) |
| B32B 7/06 | (2019.01) |
| B32B 7/14 | (2006.01) |
| B65D 65/14 | (2006.01) |
| B32B 25/08 | (2006.01) |

(52) U.S. Cl.
CPC .............. *B32B 25/08* (2013.01); *B32B 27/08* (2013.01); *B32B 37/12* (2013.01); *B32B 37/14* (2013.01); *B65D 65/14* (2013.01); *A01F 2015/0745* (2013.01); *B32B 2255/10* (2013.01); *B32B 2255/26* (2013.01); *B32B 2307/582* (2013.01); *B32B 2307/748* (2013.01); *B32B 2410/00* (2013.01); *B32B 2553/00* (2013.01)

(58) Field of Classification Search
CPC ... B32B 37/14; B32B 37/12; B32B 2307/582; B32B 2307/748; B32B 2410/00; B32B 2553/00; B32B 2255/26; B32B 2255/10; A01F 15/071; A01F 2015/0745
See application file for complete search history.

(56) References Cited

U.S. PATENT DOCUMENTS

| | | | |
|---|---|---|---|
| 6,263,650 | B1 | 7/2001 | Deutsch et al. |
| 6,383,430 | B1 | 5/2002 | Johnstone |
| 6,644,498 | B1 | 11/2003 | Lemberger et al. |
| 8,709,565 | B2 * | 4/2014 | Kalwara .................. E04D 5/12 |
| | | | 428/354 |
| 2004/0121103 | A1 | 6/2004 | Mass et al. |
| 2004/0121108 | A1 | 6/2004 | Mass et al. |
| 2004/0151853 | A1 | 8/2004 | Shirrell et al. |
| 2005/0034429 | A1 | 2/2005 | Mass et al. |
| 2006/0101624 | A1 | 5/2006 | Derscheid et al. |
| 2009/0107349 | A1 | 4/2009 | Noonan et al. |
| 2009/0226657 | A1 | 9/2009 | Thiele |
| 2009/0274881 | A1 | 11/2009 | Mass |
| 2016/0177135 | A1 | 6/2016 | Allen |

FOREIGN PATENT DOCUMENTS

| | | |
|---|---|---|
| AU | 2008229852 A1 | 5/2009 |
| AU | 2013902776 | 7/2013 |
| GB | 2348633 A | 10/2000 |
| WO | 01070497 A2 | 9/2001 |
| WO | 2004031049 A1 | 4/2004 |
| WO | 2015010151 A1 | 1/2015 |

OTHER PUBLICATIONS

Confidentiality Agreement Between Dominion Tapes Pty Ltd. and Integrated Packaging Group Pty Ltd. dated Apr. 18, 2013, pp. 1-8.
Corporate Notebook Extract made public as of the date of filing of the Statement of Grounds and Particulars (Aug. 23, 2017), p. 1.
Statement of Grounds and Particulars filed Aug. 23, 2017, pp. 1-5.
20180423 SA Declaration in Reply (14616711) filed on Apr. 23, 2018, pp. 1-10.
P113709AUM—Evidence in Answer (14337889), dated Feb. 19, 2018, pp. 1-95.

* cited by examiner fig 6

WRAPPING MATERIAL AND METHOD OF MANUFACTURE FOR BALING MATERIALS

CROSS-REFERENCE TO RELATED APPLICATIONS

The present application is a national phase entry under 35 U.S.C. § 371 of International Application No. PCT/AU2014/000821, filed on Aug. 20, 2014, published in English, which claims priority from Australian Provisional Application No. 2013903145, filed on Aug. 20, 2013, and which claims priority from Australian Provisional Application No. 2013903304, filed on Aug. 30, 2013, all of which are incorporated herein by reference.

FIELD OF THE INVENTION

The present invention relates to improvements in wrapping materials and methods of manufacture of same for wrapping of any material formed into bales, including but not limited to, harvested agricultural materials.

BACKGROUND TO THE INVENTION

It is known to form bales of harvested agricultural material, such as hay, silage making materials, cotton and the like, and to wrap same in plastic film web for storage and/or transport. It is also known to form bales of collected rubbish or waste materials and to wrap such bales in a plastic film web. One technique is to secure the formed bale initially with a net material and then to wrap same with plastics film web. A second technique is to wrap the formed bale in multiple overlapping layers of a plastic film web, Typically m such techniques the plastic film web is made from linear low density polyethylene that is made to be self adhesive to adhere to itself. In yet another technique, a single individual length of a plastic film web is used with an applied adhesive strip of sufficient strength to adhere and hold a wrapped bale. Such a technique is described in Australian patent specification nos. 2003292463 and 2005300259 which provide individual and separate lengths of plastic material web formed into a connected roll, each individual length being sufficient to wrap once around a desired bale size. Each individual and separate length is held to an adjacent length by a Z lock fold configuration at its ends and adhesive to form a temporarily continuous roll which in use in a suitable baler is separated from the roll by an applied force of sufficient strength to be then wrapped around and secured to a formed bale. A bale forming machine capable of using this type of wrapping material is disclosed in Australian patent specification no. 2008229852 and US patent specification no. 6263650.

There is a need to provide an improved wrapping material for wrapping any material formed into a bale, but particularly for harvested agricultural material formed into a bale with substantially one pass of a plastics material film web having a predefined length. There is also a need to provide a method of manufacturing such a wrapping material in a continuous roll whereby each of the predefined lengths of the plastics material film web are formed in a continuous length of adjoining portions that are separable sequentially in a baling machine.

OBJECT OF THE INVENTION

It is an object of the present invention to substantially overcome or at least ameliorate one or more of the disadvantages of the prior art, or to at least provide a useful alternative.

SUMMARY OF THE INVENTION

According to a first aspect, the present invention provides a wrapping material, said wrapping material including at least one layer of a flexible plastic material film web having a substantially uniform width and divided lengthwise into portions of substantially equal length by a plurality of spaced lines of perforations extending fully transversely across the width of the wrapping material and fully through the layer or layers forming the wrapping material, each said line of perforations having a first adhesive substrate adhered to a first surface of said wrapping material adjacent to but spaced from the line of perforations, said first adhesive substrate extending substantially across the width of said wrapping material and having, in use, an outwardly facing adhesive surface, and a second adhesive substrate extending substantially across the width of said wrapping material and being adhesively secured to said first surface of the wrapping material whereby the second adhesive substrate overlies said line of perforations.

In accordance with a second aspect, the present invention provides a method of manufacturing a roll of wrapping material for wrapping formed bales with an individual portion of said wrapping material, said method including providing a base web of a flexible plastic material film having at least one layer; forming a plurality of substantially evenly spaced lines of perforations extending fully transversely across and fully through said base web; applying a first adhesive substrate to a first surface of said base web adjacent to but spaced from each said line of perforations, said first adhesive substrate having an outwardly facing first adhesive surface covered, by a first release liner with a second adhesive surface facing outwardly; applying a second adhesive substrate to said first surface of said base web adjacent to said first adhesive substrate and overlying said line of perforations, said second adhesive substrate having a second release liner covering an outwardly facing adhesive surface of said second adhesive substrate; and rolling said base web into a said roll whereby the second adhesive surface of said first release liner adheres to a second surface of said base web.

In accordance with yet another aspect of this invention there is provided a wrapping material portion for wrapping a formed bale of material, said wrapping material portion having a base web of a flexible plastic material film having at least one layer, a leading end of said base web having a first adhesive substrate secured to a first surface of the base web and extending substantially across the width of said base web, and a second adhesive substrate adhered to said first surface at a trailing end of said material portion, said second adhesive substrate having an outwardly facing adhesive surface.

Further preferred features and aspects will become apparent from the following description of preferred embodiments given in relation to the annexed drawings.

DESCRIPTION OF PREFERRED EMBODIMENT

Figures 1, 2:
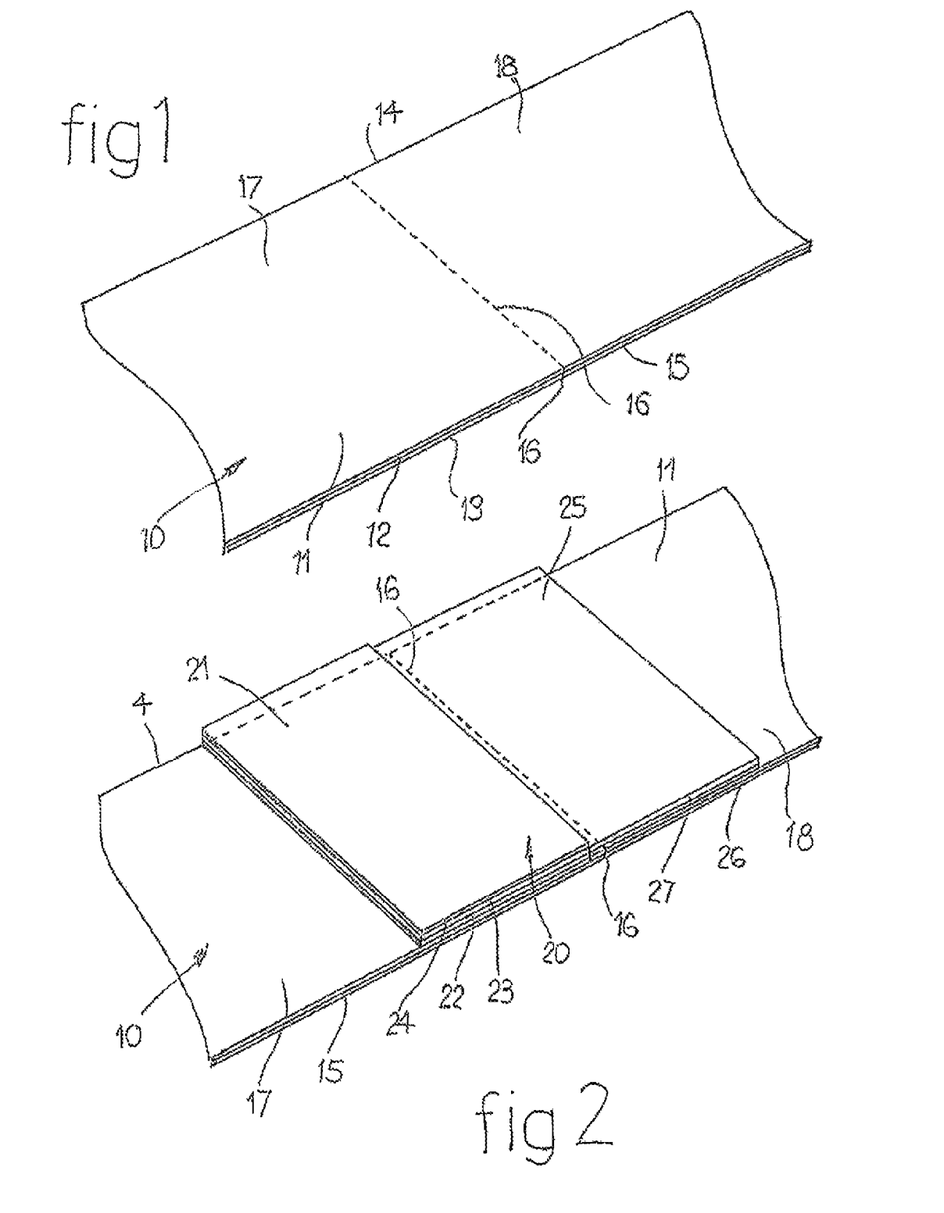
FIG. 1 is a partial schematic perspective view of a base plastic material film web usable in the present invention.
FIG. 2 is a view similar to FIG. 1 with adhesive strip materials applied to the base plastic material film web to form a wrapping material in accordance with the present invention.
Figures 3, 4:
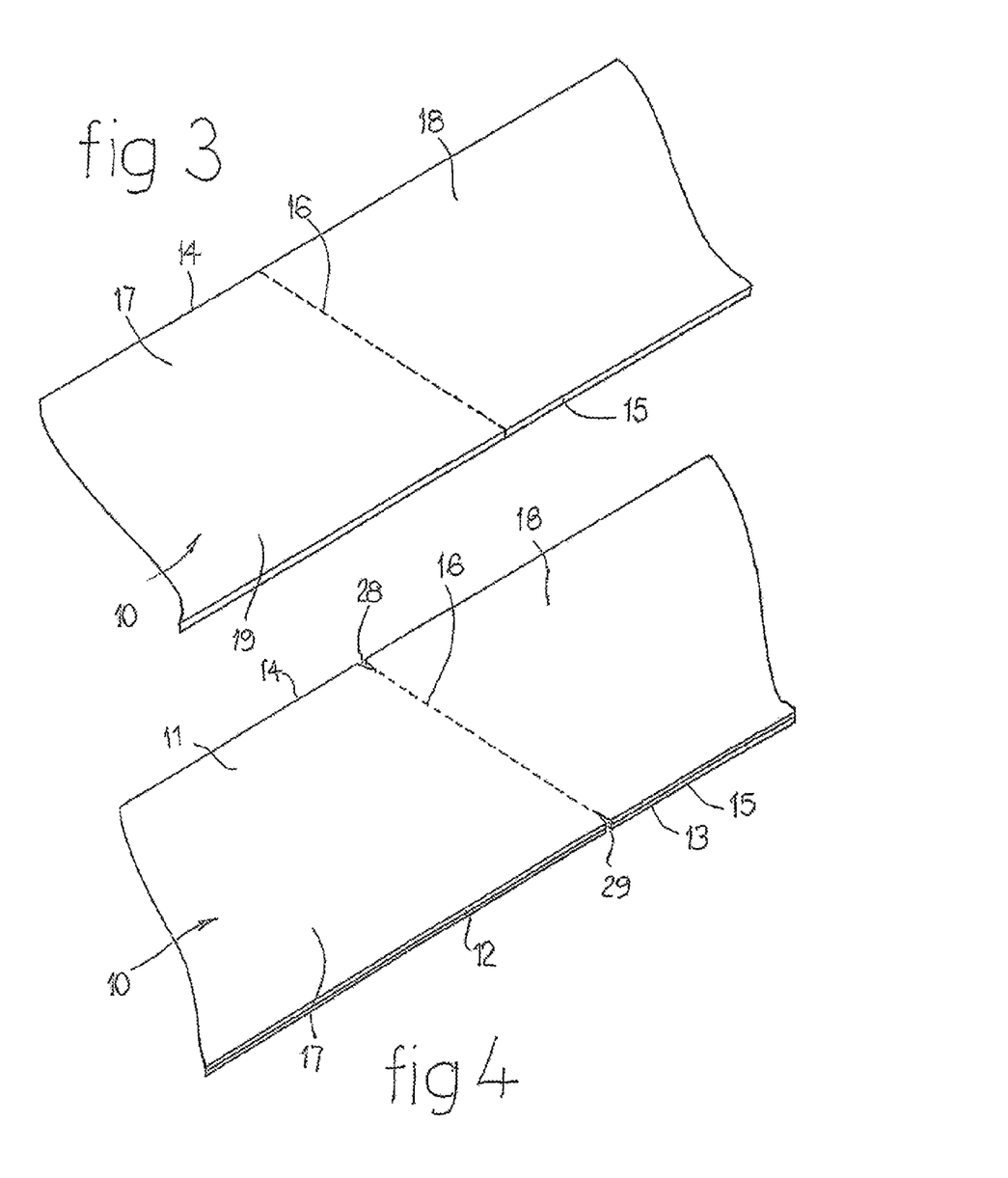
FIG. 3 is a view similar to FIG. 1 showing a further possible form of the base plastic material film web.
FIG. 4 is a view similar to FIG. 1 showing a further possible modification to the base plastic material film web in accordance with the present invention.

Referring to FIGS. 1 and 2, the wrapping material 10 may include a base plastic material film web 11 formed by two layers 12, 13 adhered to one another. The web 11 has a uniform width with side edges 14, 15 and uniformly spaced lines of perforations 16 extending fully across and through the web 11 to define individual length portions 17, 18 of equal length along the web 11. In a roll of the wrapping material, multiple portions 17, 18 are provided with the portion 17 being closer to a free end of the roll. The plastic material film of the web 11 may include any thermoplastic membrane which may include master batches and Polyisobutylene (PIB) as an adhesive including linear low density polyethylene or any other polyolefin. Other plastics materials could also be used. The web thickness may be 75 mm made up nominally of two layers of equal thickness (37.5 mm). FIG. 3 illustrates an alternative base plastic material film web 19 made of a single thickness web but otherwise has the same features as the base web of FIG. 1. FIG. 4 illustrates a further possible arrangement where the lateral edge regions of perforation line 16 are fully severed through the base plastic material film web 11, 19 at 28, 29 by a short distance (5 to 10 mm) to assist with initiation of separation in use of the wrapping material 10. Conveniently, the wrapping material is made up into rolls 45 for use in a bale wrapping machine where the individual length portions can be sequentially removed from the roll to be wrapped around a formed bale. A base wrapping material generally according to FIGS. 1 and 2 can form a roll 45 of at least 24 portions 17, 18 although this may vary depending on the thickness of the base wrap material 11.

FIG. 2 illustrates the layers of adhesive material strips 20 applied over each zone surrounding the spaced perforation lines 16 along the base plastic material film web 11, 19. The layers 20 comprise a first strip section 21 having a rubber based adhesive (AFT404) substrate 22 covered by a release liner 23 and a tissue based acrylic adhesive layer (AFTDS18) 24. The rubber based adhesive is of advantage in that it does not stick or adhere to rubber rollers in a baling machine. The first strip section 21 is applied to the base plastic material film web 11, 19 such that preferably a short distance is provided between the perforation line 16 and the adjacent edge of the adhesive substrate 22. The short distance might be of the order of 10-15 mm, preferably 5 to 10 mm. The layers 20 include a second strip section 25 comprised of a tissue based adhesive acrylic based adhesive (AFTDS18) separation layer 26 adhered to the base plastic material film web 11, 19 and a covering release liner 27. Conveniently the second strip section 25 abuts the first strip section 21 such that the tissue based adhesive and separation layer 26 overlies the perforation line 16. Although the drawings illustrate the tissue based adhesive layer 26 abutting the double sided adhesive tape on a rubber based substrate 22, it is possible for the layer 26 to overlay the substrate 22.

Figure 5:
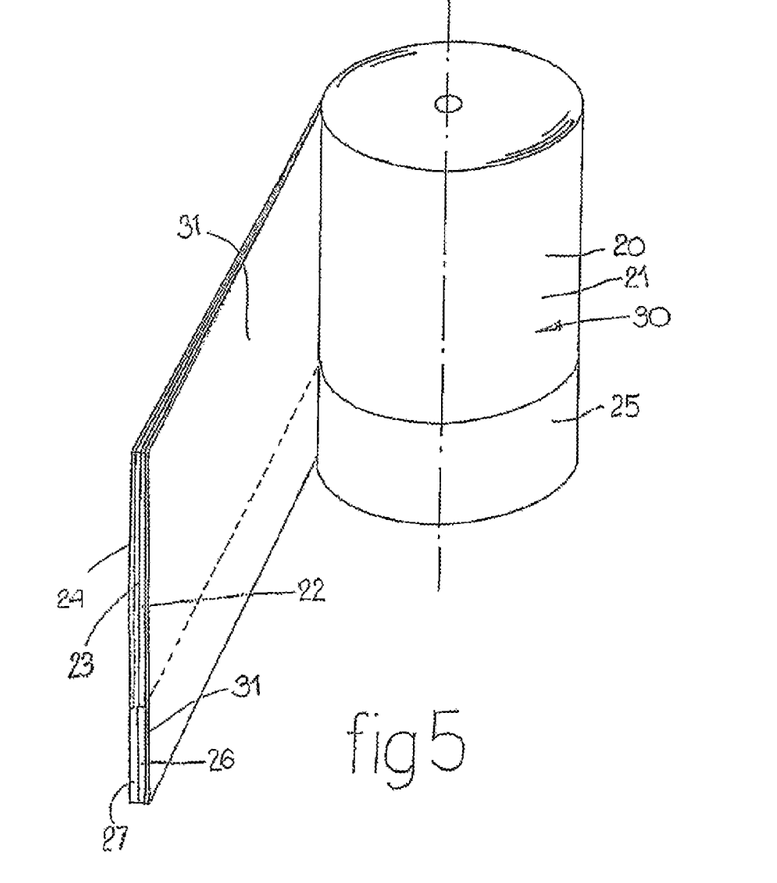
FIG. 5 shows a roll of adhesive material strip usable to form the wrapping material of FIG. 2.
Figure 6:
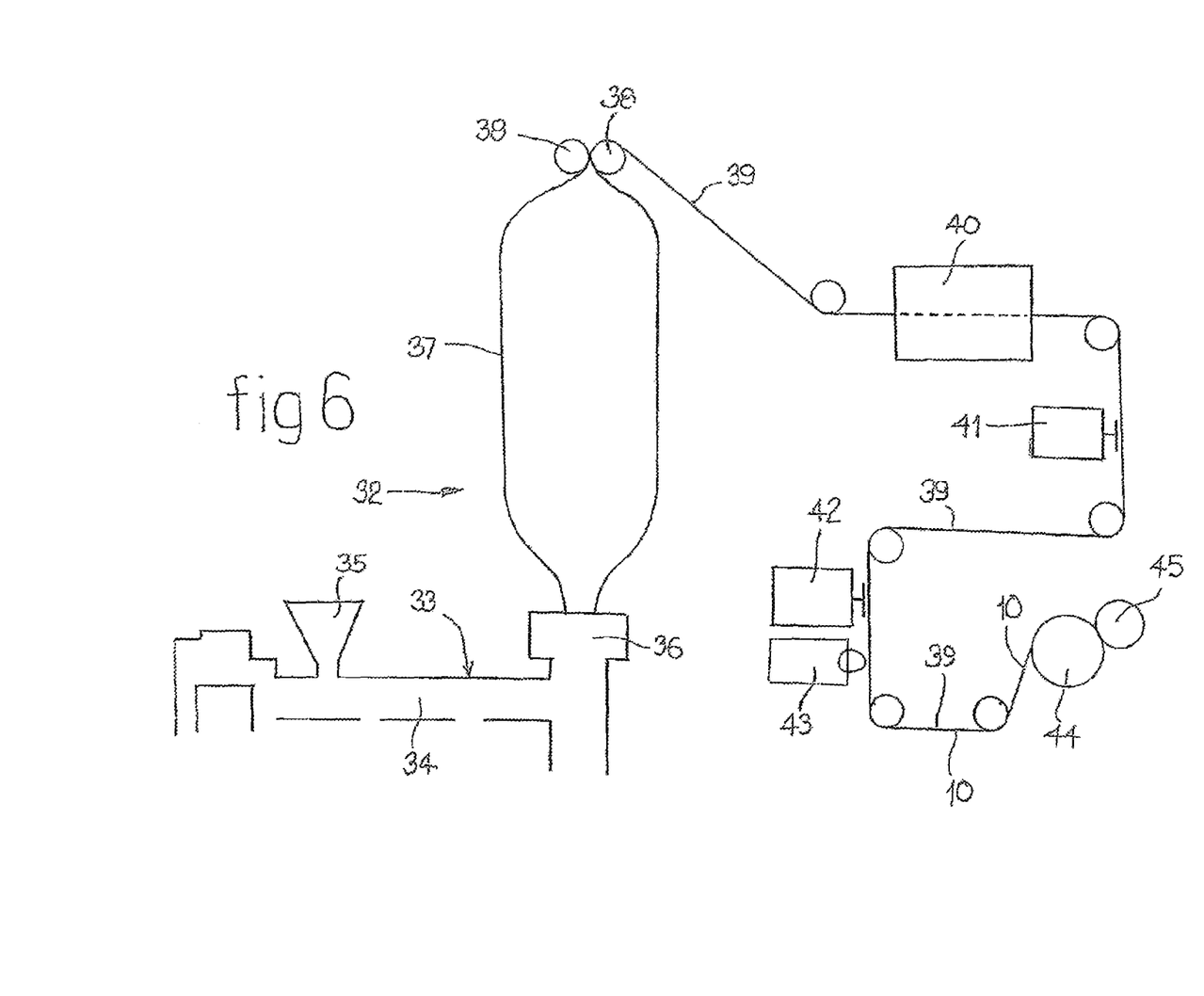
FIG. 6 shows schematically, preferred methods of manufacturing the wrapping material according to the present invention.
Figure 7:
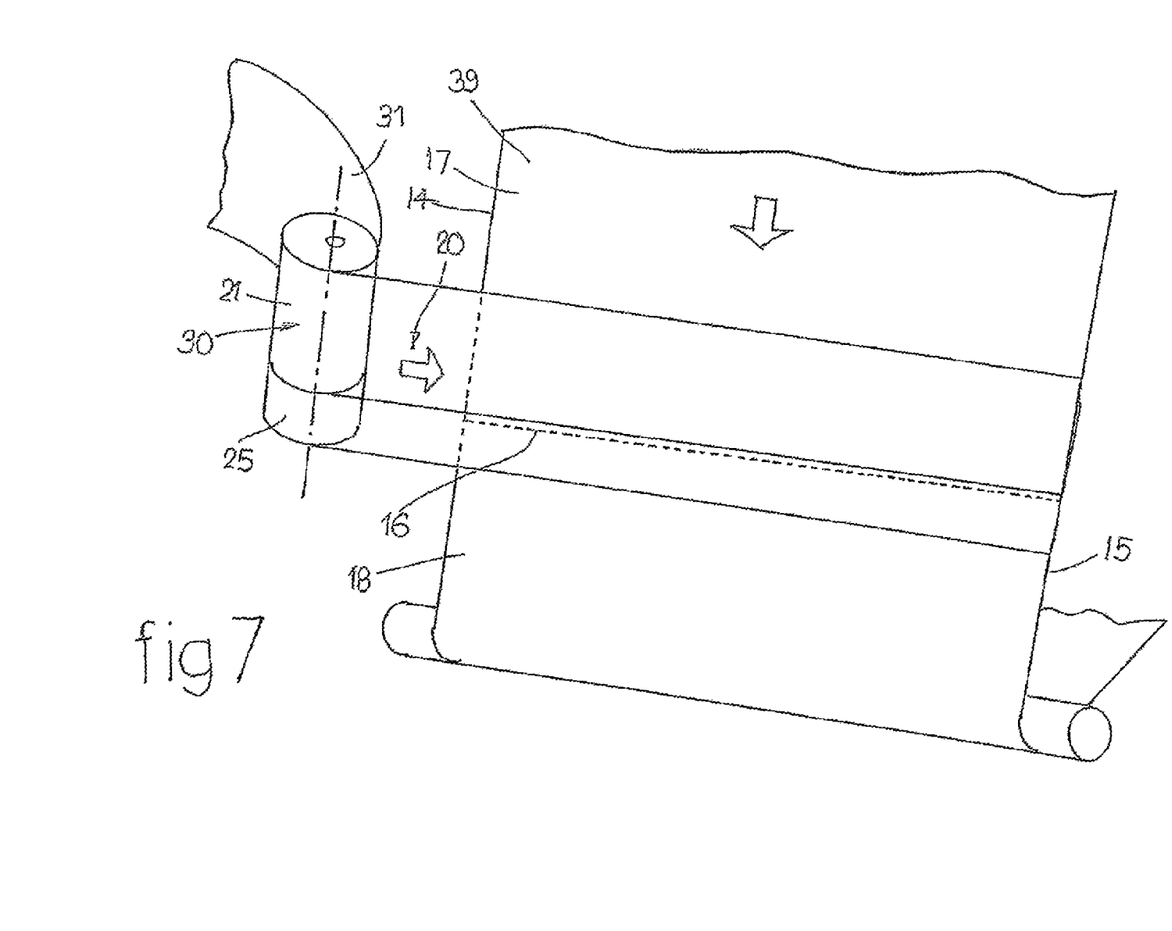
FIG. 7 is a schematic perspective view of one stage in the manufacturing process represented in FIG. 1.

FIG. 5 illustrates a roll 30 of adhesive material strips 20 supported on a release liner layer 31 such that the strips 20 can be formed into a roll ready for application in a wrapping material manufacturing technique as illustrated in FIGS. 6 and 7. In one preferred construction, the first strip section 21 may have a width of 200 to 333 mm, preferably about 250 mm. The second strip section 25 may have a width of 75 to 150 mm, preferably about 100 mm, although other dimensions are possible.

The acrylic based tissue adhesive (AFTDS18) used for layers 26 and 24 has a tear strength that is substantially equal in all directions. The adhesive layer 26, in overlying the perforation lines 16 increases the strength of the perforation lines from approximately 20 newtons to about 55 newtons such that the web holds together for handling purposes as a continuous web in a baling machine (or similar) until such time as it is desired to remove a web portion from the roll for wrapping about a formed bale. The rubber based adhesive substrate 22 has adhesive effect on both faces and has a tear strength that is greater in the longitudinal direction of the base web material 11, 19 than on the transverse direction when the substrate 22 is applied to the base web material 11, 19. Moreover, the tear strength in the longitudinal direction is greater than that of the adhesive layer 26.

FIG. 6 illustrates schematically some possible methods of manufacturing a wrapping material 10 in accordance with the present invention. As illustrated, the manufacturing apparatus 32 may include a bubble film production machine 33 including a resin extruder 34, a raw material feed hopper 35 and a die and air ring 36 for forming an air inflated film bubble or tube 37 of conventional form. The film bubble may be a mono layer plastics material or a multi layered co-extruded structure including two, three or more layers coextruded structures. In the latter case, the inner surface of the plastics material film bubble may contain PIB (polyisobutylene) to aid with the adherence of the layers together when flattened. The film bubble 37 is passed through nip rollers 38 to press the film together forming a flattened film of two adhered layers 39 with a normal width slightly greater than that of the required wrapping material. The two adhered layers 39 also having a nominal thickness equivalent to the thickness of the desired wrapping material. Of course, if the extruder produces multiple layers then each of the two layers will have further internally different layer structures. The layers 39 are then passed to a perforating machine 40 to form a full width line of perforations 16 (FIGS. 1 to 5) fully across the width of the layers 39 and fully through the layers 39. Rather than using blown film, it is also possible to use cast film and laminated cast film if desired. The perforation lines 16 are formed at evenly spaced intervals whereby the length of the material layers 39 between the perforation lines is equivalent to one wrap material length for a desired bale size. The wrap material base layers 39 (FIGS. 1, 4) might then be formed into rolls for subsequent processing as illustrated, or continued processing in line could occur as described hereafter. The apparatus 32 might include an optional labelling devices 41, such as an RFID labeller, for applying indicative labels (as desired) to the base layers of the wrap material 39. If used, the labelling device 41 might be provided at any stage in the production process, post formation of the perforation lines 16. Moreover in an automatic baling machine, the film web exiting the roll 45 will be braked by any suitable means whereby continued movement of the foremost portion 17 will cause sufficient separation forces on the perforation line 16 to initiate separation of the portion 17 from the remainder of the connected portions on the roll 45. The labelling device 41 may then apply an indicative marker or label to the base web material to initiate braking of the web material in a baling machine.

The apparatus 32 may further include a tape application station 42 for applying an adhesive tape strip 20 to the region of each perforation line 16 (FIG. 7). In this embodiment, the backing release line 31 is removed from the strips 20 and the adhesive strips are laid fully across the surface 46 (in use) of the web 39 with the second strip section 25 overlying the perforation line 16. The strips 20 are separated from the roll 30 adjacent the near edge of the base material film web 39 and thereafter an edge trimming device 43 trims the edges 14, 15 of the base material web 39 including, if needed, ends of the strips 20 such that the then formed wrapping material 10 has the required width. The wrapping material 10 then passes over a driven lay-on roller 44 to be rolled up as a roll 45 ready for use in a baler.

Figure 8A:
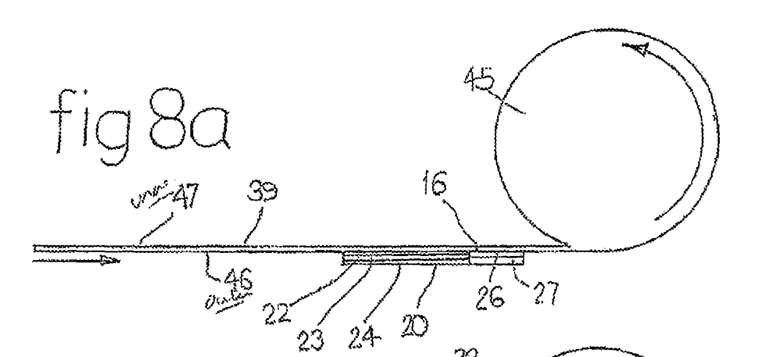
FIGS. 8a, 8b, 8c and 8d illustrate stages in the rolling up a wrapping material produced according to the method described in relation to FIG. 6 and in the unrolling of this wrapping material in use in a baling machine.
Figure 8B:
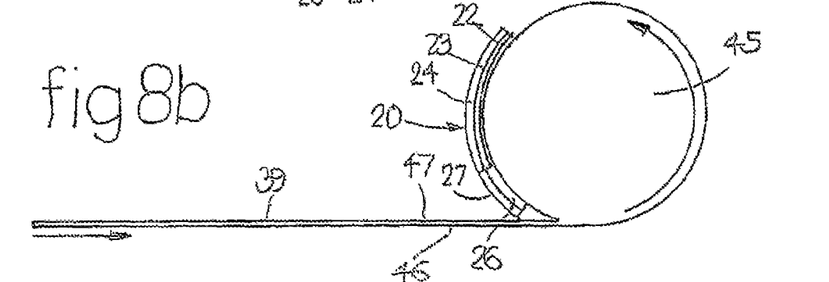
Figure 8C:
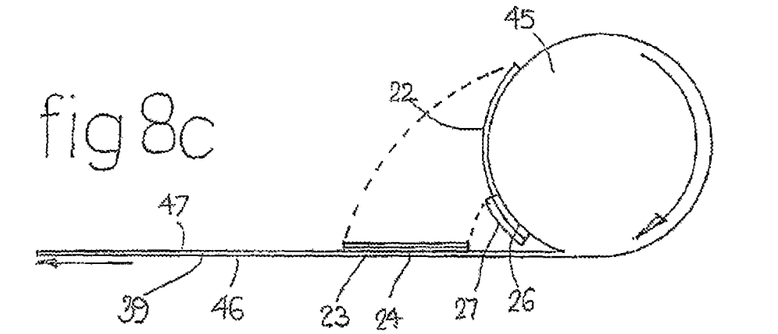
Figure 8D:
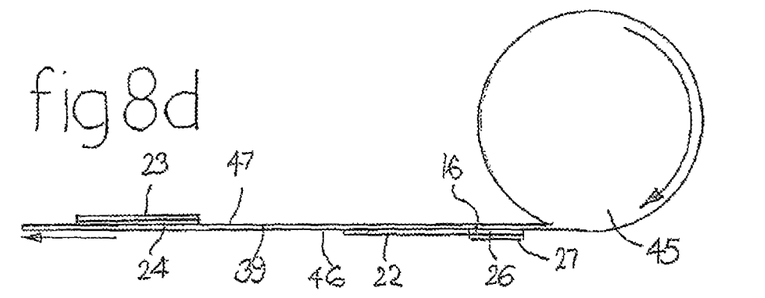

FIGS. 8a and 8b illustrate the adhesive strips 20 applied to the web surface 46 as the roll 45 is formed such that the adhesive strips 20 are sandwiched between two portions of the base material film web with adhesive layers 22, 26 adhered to the web surface 46 and the adhesive layer 24 adhered to an opposed surface 47 of the base material film web 39. FIGS. 8c and 8d illustrate schematically, the adhesive strips 20 as the roll 45 is rolled out in use in a baler. As shown in FIG. 8c, the release liner 23 and adhesive layer 24 detach from the substrate adhesive layer 22 and remain adhered to the other surface 47 of the base film web material 39. The remainder of the strips 20, namely the substrate adhesive layer 22 and the adhesive layer 26 and release liner 27 remain adhered to the outer surface 46 of the base film web material 39. The adhesive substrate layer 22 is adhered adjacent to a perforation line 16 at a trailing end of a forward portion length 17 of the base film web material 39 with the adhesive strip 26 and release liner 27 adhered to a leading end of a following portion length 18 of the base film web material 39.

Figures 9, 10A, 10B:
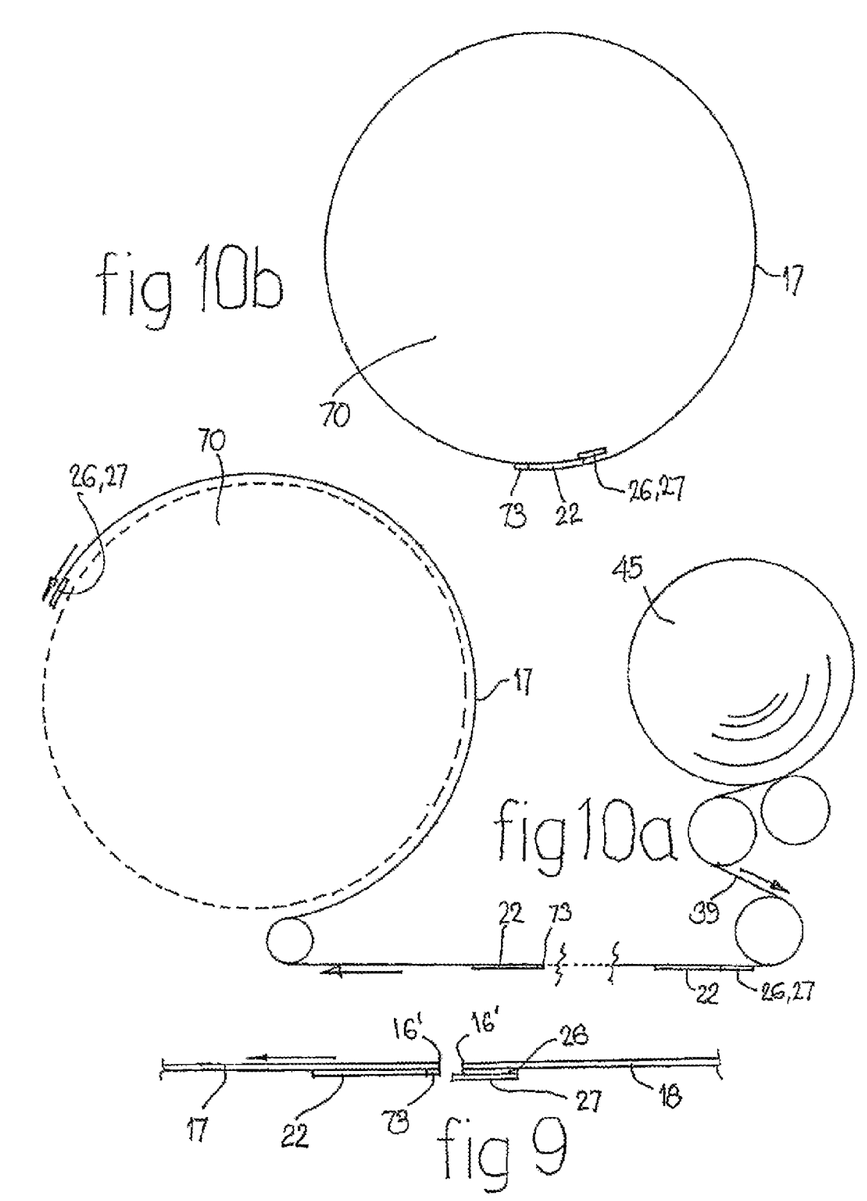
FIG. 9 illustrates schematically in edge elevation view, the point at which separation occurs between portions of the wrapping material.
FIG. 10a illustrates a portion of the wrapping material being fed into a baler chamber.
FIG. 10b illustrates the portion of the wrapping material wrapped about a formed bale.

As shown in FIG. 9, the lead or forward portion is, in use, carried forward by the baler with the following portion length 18 braked with the remainder of the roll 45. At a predetermined force loading, the portions separate at the perforation line 16. Separation initiates on the highest elongation point on the outermost edges 14, 15 of the base film web 11, 19 where it incrementally creates a separation angle great enough to initiate the activation of the perforations of line 16 at the required angle as opposed to a straight linear direction break. At the point of separation the tissue based adhesive layer 26 has a stronger bond to the film layer than the release liner and transfers across to provide an adhesive strip 73 to cover the gap between the edge of the perforation point and the nominal distance to the rubber based substrate adhesive layer 22 set back from the perforation line 16. The perforation once activated by the separation of the adhesive tissue layer 26, creates a secondary process which allows the tape to tear along the perforation separation point creating a substantially clean edge 16 with fine film tails created by normal mechanical working of a perforation.

As shown in FIGS. 10a, 10b the separated film portion 17 is fed into the baler chamber with the adhesive layer 26 and release layer 27 on the lead edge stiffening and assisting feeding of the web into the chamber about a bale 70. The film portion 17 passes around a roller 71 along a feed path 72 and around the bale 70 with the trailing edge zone carrying the rubber based adhesive substrate 22 being pressed to the lead edge zone to complete the wrapping process (FIG. 10b). The adhesive strip 73 and the adhesive substrate 22 ensures that the tail end of the film web portion 17 has no regions likely to lift and break the seal of the wrapping.

The invention claimed is:

1. A wrapping material portion for wrapping a formed bale of material, said wrapping material portion comprising a base film web of a flexible plastic material film having at least one layer, a leading end of said base film web having a first adhesive substrate secured to a first surface of the base film web, said first adhesive substrate having a first outwardly facing adhesive surface and a first release liner overlying said first adhesive surface, and a second adhesive substrate adhered to said first surface at a trailing end of said material portion, said second adhesive substrate having a second outwardly facing adhesive surface and a second release liner overlying said second adhesive surface, wherein at least a portion of the second adhesive substrate extends beyond the trailing end of said material portion.

2. A wrapping material for formed bales of material, said wrapping material comprising at least one layer of a flexible plastic material film web having a substantially uniform width and divided lengthwise into portions of substantially equal length by a plurality of spaced lines of perforations extending fully transversely across the width of the wrapping material and fully through the layer or layers forming the wrapping material, each said line of perforations having a first adhesive substrate adhered to a first surface of said wrapping material adjacent to but spaced from the line of perforations, said first adhesive substrate extending substantially across the width of said wrapping material and having, in use, an outwardly facing adhesive surface, a second adhesive substrate extending substantially across the width of said wrapping material and being adhesively secured to said first surface of the wrapping material adjacent to the first adhesive substrate, whereby the second adhesive substrate overlies said line of perforations, a first release liner overlying the first adhesive substrate, and a second release liner overlying the second adhesive substrate.

3. A wrapping material according to claim 2, wherein said first surface is intended, in use, to form an inner face of the wrapping material when applied to a formed bale.

4. A wrapping material according to claim 2, wherein said second adhesive substrate is substantially non-extendible.

5. A wrapping material according to claim 2, wherein the second adhesive substrate is weaker than the first adhesive substrate in said lengthwise direction of said plastic material film web.

6. A wrapping material according to claim 2, wherein each said line of perforations include fully severed sections extending inwardly from at least one side edge of the wrapping material.

7. A wrapping material according to claim 2, wherein a single said layer of flexible plastic material film web forms a base material of said wrapping material.

8. A wrapping material according to claim 2, wherein at least two said layers of flexible plastic material film web form a base material of said wrapping material, said two or more layers being adhered or bonded together.

9. A wrapping material according to claim 8, wherein the base material is formed by a blown extruded film tube pressed together to bond two said layers of flexible plastic material film web together.

10. A wrapping material according to claim 9, wherein the blown extruded tube has a tube wall made up of two or more material layers.

11. A wrapping material according to claim 2, wherein said first adhesive substrate includes a rubber based adhesive.

12. A wrapping material according to claim 2, wherein the material intended to be wrapped is harvested cotton, harvested agricultural material other than cotton, or a non-agricultural material.

13. A wrapping material for wrapping a formed bale of solid material, said wrapping material having:
    a base film web of a flexible plastic material film having at least one layer, the base film web having a first surface and a second surface and evenly spaced lines of perforation across the width of the wrapping material, defining lengthwise portions of wrapping material of substantially equal length of the base film web;
    a first adhesive substrate adhered to the first surface of a particular lengthwise portion of wrapping material, the first adhesive substrate having an outwardly facing adhesive surface; and
    a first release liner covering the first adhesive substrate, and having an outwardly facing adhesive surface;
    wherein, when the wrapping material is rolled onto a roll, for the first adhesive substrate on the particular lengthwise portion of wrapping material, the outwardly facing adhesive surface of the first release liner adheres to the second surface of the same particular lengthwise portion of wrapping material such that, when the wrapping material is unrolled, the first release liner is separated from the first adhesive substrate, and remains adhered to said second surface of the same particular lengthwise portion of wrapping material, to expose the outwardly facing adhesive surface of the first adhesive substrate adhered to said first surface of the same particular lengthwise portion of wrapping material.

14. The wrapping material according to claim 13, further including:
    a second adhesive substrate adhered to the first surface of the base film web adjacent to the first adhesive substrate, the second adhesive substrate having an outwardly facing adhesive surface; and
    a second release liner covering the outwardly facing adhesive surface of the second adhesive substrate.

15. The wrapping material according to claim 14, wherein the first adhesive substrate extends substantially across the width of the base film web and the second adhesive substrate extends substantially across the width of the base film web.

16. The wrapping material according to claim 14, wherein the second adhesive substrate at least partially overlies the evenly spaced lines of perforation.

17. The wrapping material according to claim 14, wherein the second adhesive substrate is substantially non-extendible.

18. The wrapping material according to claim 13, wherein the evenly spaced lines of perforation extend at an angle from a respective edge of the wrapping material to form an apex.

19. The wrapping material according to claim 13, wherein the evenly spaced lines of perforation are fully severed through the base film web near each respective edge region to facilitate initiation of separation in use.

20. The wrapping material according to claim 13, wherein the first surface of the base film web, in use, forms an inner face of the wrapping material when applied to the formed bale.

21. The wrapping material according to claim 13, wherein at least two layers of flexible plastic material film web form the base film web of the wrapping material, the at least two layers being adhered or bonded together.

* * * * *